(12) United States Patent
Gann

(10) Patent No.: US 6,963,428 B1
(45) Date of Patent: Nov. 8, 2005

(54) METHOD AND SYSTEM FOR CALIBRATING A LOOK-DOWN LINEAR ARRAY SCANNER UTILIZING A FOLDED OPTICAL PATH

(75) Inventor: Robert G Gann, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 662 days.

(21) Appl. No.: 09/626,625

(22) Filed: Jul. 27, 2000

(51) Int. Cl.$^7$ .......................... H04N 1/04; H04N 1/00; H04N 1/46; H04N 17/00; H01J 3/14

(52) U.S. Cl. ..................... 358/474; 358/406; 358/504; 250/234; 250/236; 348/79; 348/95; 348/180; 348/190

(58) Field of Search .................. 358/474, 406, 358/504; 250/234, 236; 348/79, 95, 180, 348/190, 187, 188, 189

(56) References Cited

U.S. PATENT DOCUMENTS

| | | | |
|---|---|---|---|
| 3,293,357 A * | 12/1966 | Doi et al. | 348/188 |
| 4,513,319 A * | 4/1985 | Breimer et al. | 348/188 |
| 4,967,233 A | 10/1990 | Buchar et al. | |
| 5,227,896 A * | 7/1993 | Ozawa et al. | 358/474 |
| 5,453,840 A * | 9/1995 | Parker et al. | 356/400 |
| 5,515,181 A | 5/1996 | Iyoda et al. | 358/474 |
| 5,760,925 A * | 6/1998 | Saund et al. | 358/497 |
| 5,847,884 A * | 12/1998 | Kamon et al. | 359/806 |
| 5,969,845 A | 10/1999 | Tsai et al. | |
| 6,041,146 A * | 3/2000 | Kamon et al. | 382/274 |
| 6,198,547 B1 * | 3/2001 | Matsuda | 358/474 |
| 6,222,934 B1 * | 4/2001 | Tsai | 382/112 |
| 6,437,823 B1 * | 8/2002 | Zhang | 348/187 |
| 6,721,465 B1 * | 4/2004 | Nakashima et al. | 382/318 |

FOREIGN PATENT DOCUMENTS

| | | |
|---|---|---|
| WO | WO98/44718 A2 | 10/1998 |
| WO | WO98/44718 A3 | 10/1998 |

* cited by examiner

Primary Examiner—Edward Coles
Assistant Examiner—Houshang Safaipour

(57) ABSTRACT

A system and method are disclosed which provide a look-down digital imaging device capable of scanning a calibration area included within such look-down digital imaging device to capture image data for the calibration area and calibrate itself based on analysis of such captured image data. More specifically, a preferred embodiment includes a calibration area that is integrated internally within the look-down digital imaging device. When performing calibration in such a preferred embodiment, the scan head of the look-down digital imaging device is operable to align itself with the calibration area to allow for a scan of the calibration area (i.e., the capture of digital image data of the calibration area). In one embodiment, a look-down digital imaging device does not achieve a focused scan of the calibration area, but is capable of utilizing captured unfocused digital imaging data for calibration. In a preferred embodiment, a look-down digital imaging device achieves a focused scan of the calibration area, thereby enabling a further accurate calibration. More specifically, a preferred embodiment folds the optical path of the reflected light from the calibration area in order to have the optical path of such calibration area accurately mimic the optical path of an original to be scanned, thereby allowing for focused calibration to be achieved.

27 Claims, 4 Drawing Sheets

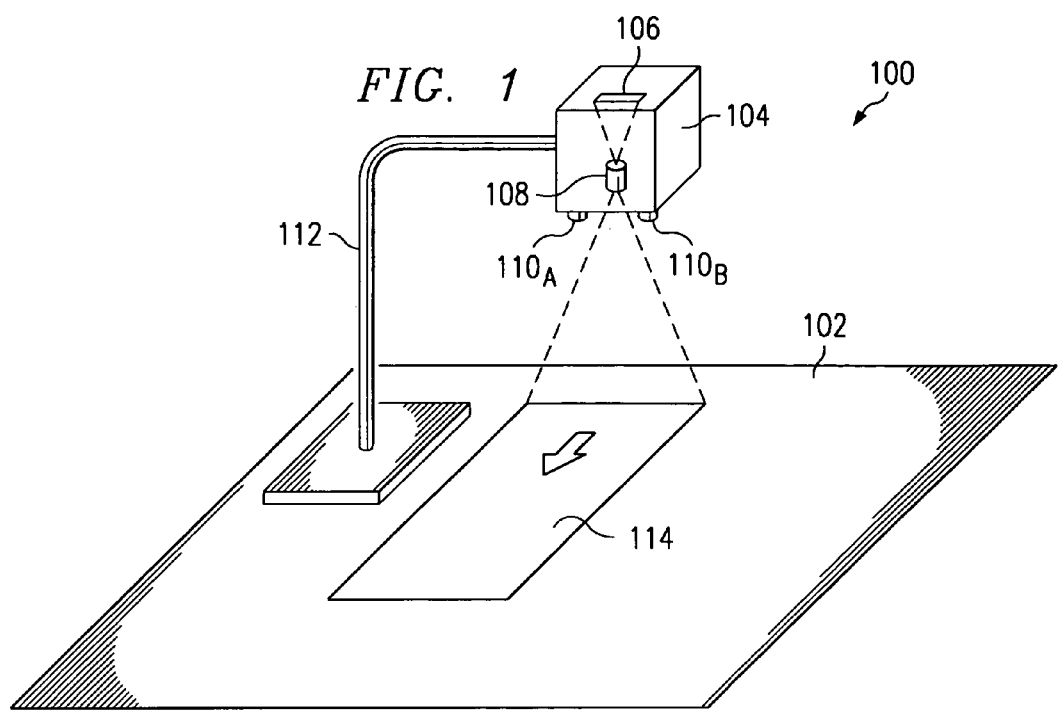
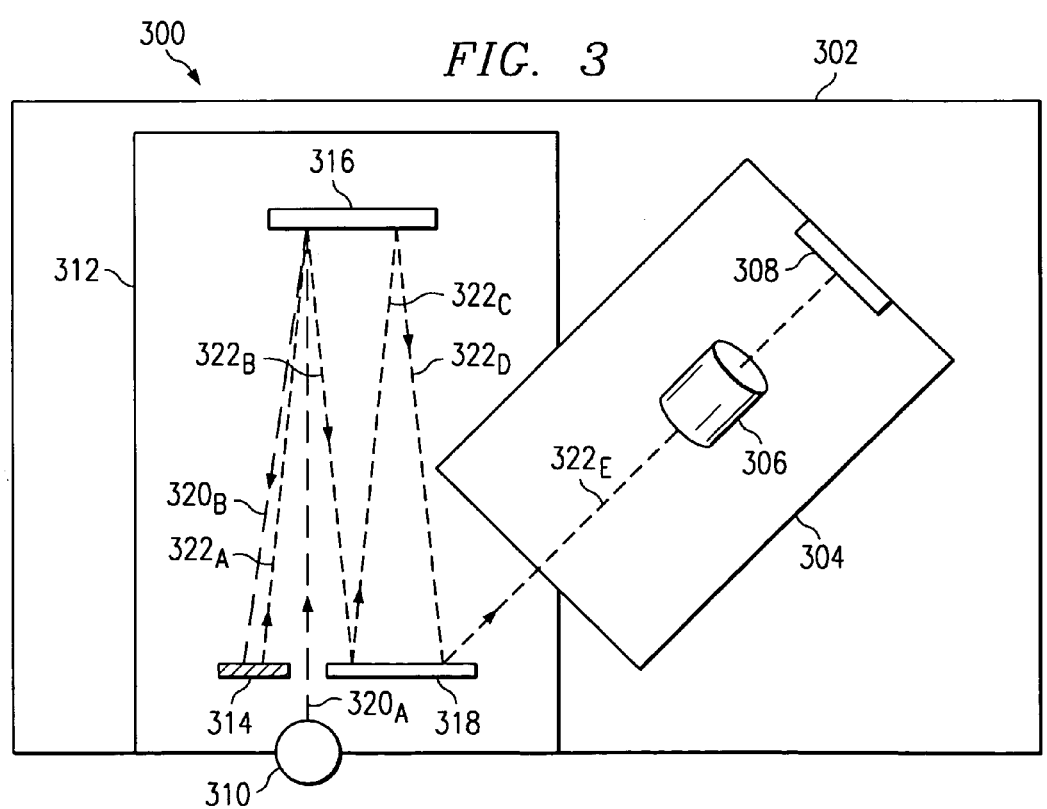

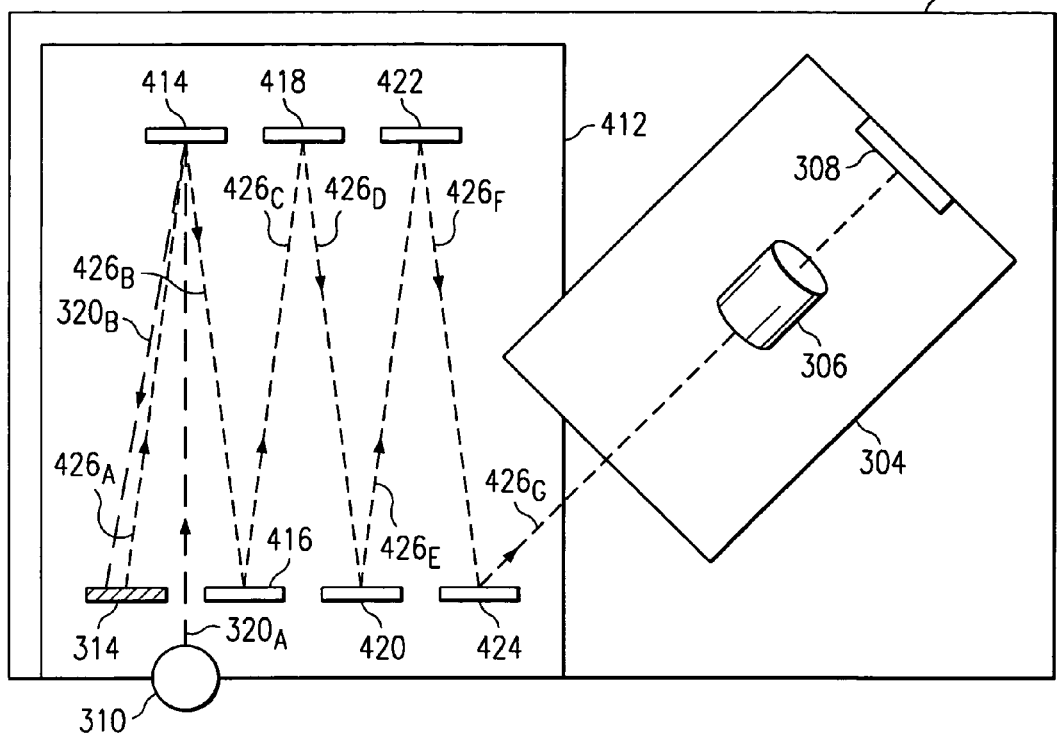
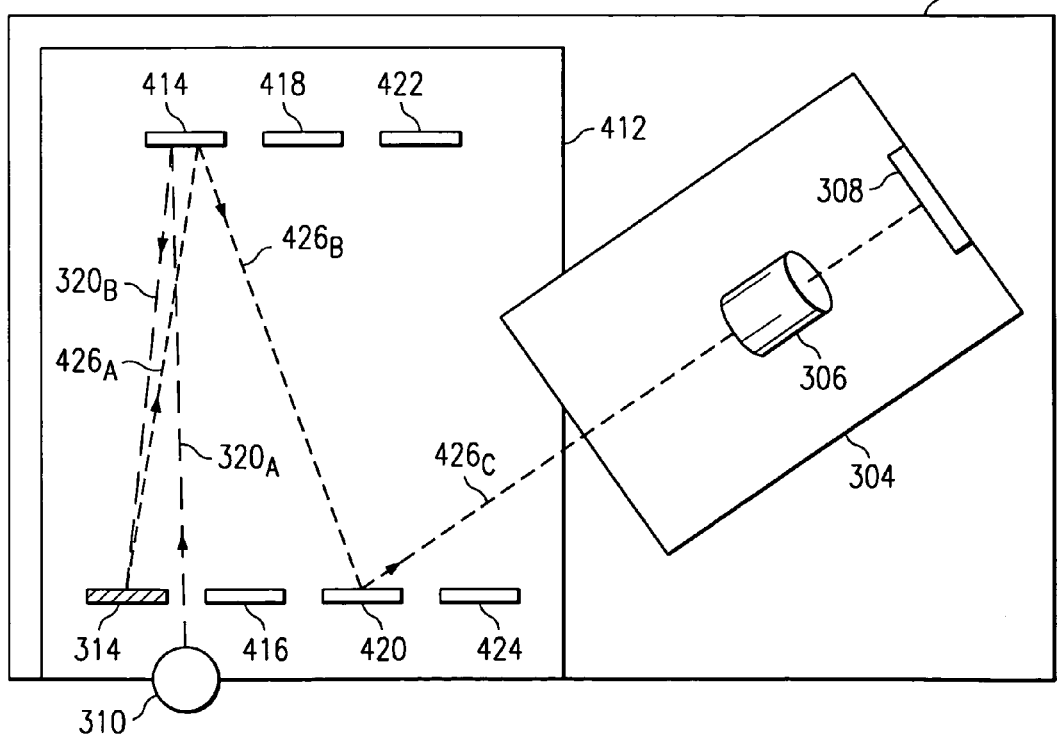

METHOD AND SYSTEM FOR CALIBRATING A LOOK-DOWN LINEAR ARRAY SCANNER UTILIZING A FOLDED OPTICAL PATH

TECHNICAL FIELD

The present invention relates in general to a system and method for calibrating a digital imaging device, and in specific to a method and system for calibrating a look-down digital imaging device.

BACKGROUND

Various types of digital image capture (or image reading) devices are available in the prior art. More particularly, various types of image capture devices are available in the prior art for obtaining a digital image of an original image. For example, image capture devices such as scanners (both handheld and flatbed) for personal computers, digital cameras, facsimile machines, and digital copying machines are available in the prior art. Some of these traditional digital imaging devices perform calibration before each capture of a digital image, upon power up, periodically, or according to some other appropriate regime to ensure that the digital imaging devices are properly calibrated, thereby enabling the digital imaging devices to capture high quality digital images.

Typically, a traditional digital imaging device, such as a flatbed scanner, includes a calibration area therein, which is scanned by the digital imaging device in order to properly calibrate such device. For example, a flatbed scanner typically includes a calibration area, which may comprise an image implemented within a portion of the flatbed scanner, an ink or silk screen, or a sticker having an image thereon, or may simply be a portion of the plastic that forms the scanner's housing, as examples. Such a calibration area is located in a position such that the flatbed scanner's scanner head is capable of scanning the calibration area to calibrate itself. For example, the calibration area may be located at the top or the bottom of the scan bed, depending on how the scan head is positioned when it is idle. To perform calibration, the flatbed scanner scans the calibration area and then based on analysis of the captured image data for the known calibration area, the scanner adjusts/corrects for defects (or quality errors), such as variations of illumination, sensor sensitivity, pixel errors, etcetera. Thus, the flatbed scanner can calibrate itself by scanning a known calibration area that is included within the scanner, and adjusting its imaging (e.g., illumination, etcetera) such that a high quality digital image of the known calibration area is obtained.

A flatbed scanner may also perform a "dark calibration," wherein the scanner's lamp is turned off such that the calibration area is not illuminated. A scan is performed without the calibration area illuminated, and the scanner ensures that it captures a completely black (or dark) digital image. The sensor (i.e., the image pick-up device) of the scanner may not output a zero signal (indicating no light reflection) when scanning a completely dark area, but may instead output a very small signal (e.g., voltage level). Some sensors are implemented to output large voltage levels to indicate darkness and small voltage levels to indicate light. In either case, the signal actually output by a sensor may not correspond to the expected signal for indicating a very dark or very light area of a scanned original. Accordingly, by performing a calibration scan and analyzing the output of the sensor in comparison with an expected output, the scanner can adjust/calibrate itself to properly interpret reflected light intensities from an original. Offset circuits and/or software may be utilized to adjust the scanner in response to such calibration. Thus, a flatbed scanner may measure the voltage output for each pixel of the known calibration area when the area is illuminated and when very dark to ensure that it is properly calibrated. More specifically, the scanner may store information obtained from such a calibration scan either in the scanner itself or in a computer to which the scanner is coupled, and the appropriate correcting factors are then applied for a subsequent scan of an original to ensure that the digital image captured is an accurate likeness of the original (e.g., appropriate color, no streaks, appropriate darkness, etc.). That is, appropriate adjustments are made in the scanner's hardware and/or software to ensure that the scanner is properly calibrated for scanning an original. For example, the light source of the scanner may not illuminate the edges of an original document with as great an intensity as the center of the original document. If the scanner were not properly calibrated, the captured digital image of the original may show the edges of the original as being dark, when they may in fact be white. As a result, it may be difficult to perform further image processing, such as optical character recognition (OCR) operations, of such an inaccurate digital image. However, by properly calibrating the scanner, it can properly compensate for such a "roll-off" of light on the edges of the document, for example, and capture a digital image having an accurate likeness of the original.

More recently, look-down digital imaging devices have been developed. In general, look-down digital imaging devices include a digital imaging device that looks down at an original positioned face up below the digital imaging device, and the digital imaging device captures a digital image of such original. As an example of such a look-down digital imaging device of the prior art, digital document cameras have recently become commercially available. For instance, a prior art digital document camera is commercially available from Canon, such as Canon's digital document camera model DZ-3600U. Further examples of prior art look-down digital imaging devices include those disclosed in U.S. Pat. No. 5,227,896 issued to Takashi Ozawa entitled "IMAGE READER FOR PRODUCING AND SYNTHESIZING SEGMENTED IMAGE DATA" and U.S. Pat. No. 5,515,181 issued to Tetsuo Iyoda entitled "IMAGE READING APPARATUS PROVIDING HIGH QUALITY IMAGES THROUGH SYNTHESIS OF SEGMENTED IMAGE DATA."

However, look-down digital imaging devices of the prior art generally do not include a mechanism for calibrating such devices. As described above, flatbed scanners typically include a calibration area that is utilized in a manner that accurately imitates the reflected path of light when scanning an original. However, such a calibration path is generally not available in look-down digital imaging devices. One possible technique for calibrating a look-down digital imaging device of the prior art is for a user to place a calibration image on the target scan area below the look-down digital imaging device and then scan such calibration image in order to calibrate the look-down digital imaging device. However, this technique requires action by the user to perform calibration of the look-down digital imaging device. That is, the user is required to place a calibration image on the target scan area and initiate the calibration process. Accordingly, such a calibration technique would be inefficient, inconvenient and undesirable to a user, especially if calibration of the look-down digital imaging device is desired before every scan of an original. Furthermore, because such calibration technique relies on a scan of an image external to the look-down digital imaging device, such calibration technique is likely not as reliably accurate as is desired. That is, this calibration technique is not performed within such a controlled environment as is available within the digital imaging device itself. Thus, external factors such as the calibration image being improperly positioned on the target area or the calibration image being dirty or otherwise damaged, as examples, may prevent the look-down digital imaging device from being properly calibrated.

SUMMARY OF THE INVENTION

In view of the above, a desire exists for a system and method for calibrating a look-down digital imaging device. More specifically, a desire exists for a system and method for calibrating a look-down digital imaging device within a controlled environment internal to such a look-down digital imaging device.

These and other objects, features and technical advantages are achieved by a system and method which provide a look-down digital imaging device capable of scanning a calibration area included within such look-down digital imaging device to capture image data for the calibration area and calibrate itself based on analysis of such captured image data. More specifically, a preferred embodiment includes a calibration area that is integrated internally within the look-down digital imaging device. When performing calibration in such a preferred embodiment, the scan head of the look-down digital imaging device is operable to align itself with the calibration area to allow for a scan of the calibration area (i.e., the capture of digital image data of the calibration area). In one embodiment, a look-down digital imaging device does not achieve a focused scan of the calibration area, but is capable of utilizing captured unfocused digital imaging data for calibration. In a preferred embodiment, a look-down digital imaging device achieves a focused scan of the calibration area, thereby enabling a further accurate calibration. More specifically, a preferred embodiment folds the optical path of the reflected light from the calibration area in order to have the optical path of such calibration area accurately mimic the optical path of an original to be scanned, thereby allowing for focused calibration to be achieved.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which:

FIG. 1 shows an exemplary look-down digital imaging device;

FIG. 3 shows an exemplary implementation of a preferred embodiment of the present invention in which a folded optical path is utilized for calibrating a look-down digital imaging device;

FIGS. 4A and 4B show an exemplary implementation of a preferred embodiment wherein the length of the calibration path is adjustable through folding to imitate the length of the path for scanning an original image.

DETAILED DESCRIPTION

Figure 2A:
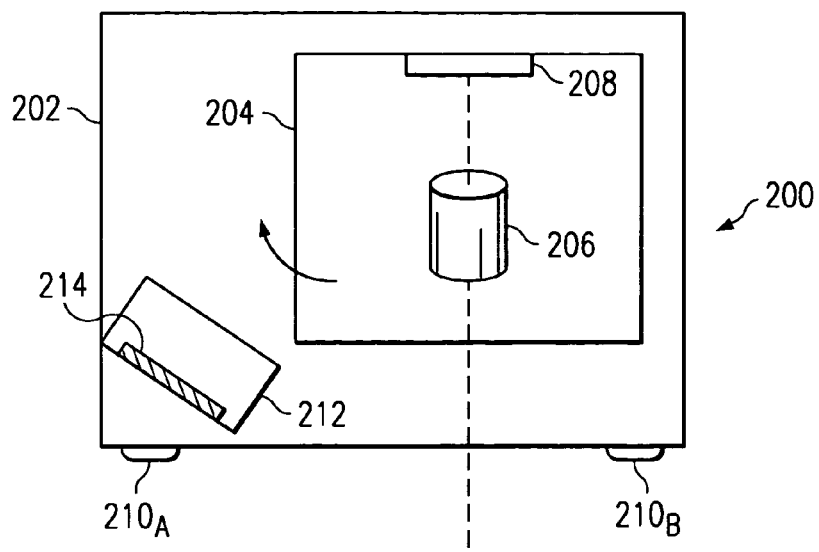
FIG. 2A shows an exemplary implementation of one embodiment of the present invention in which a look-down digital imaging device includes an image head for scanning an original to obtain a digital image thereof and a hood for calibration of the look-down digital imaging device.

Turning to FIG. 1, an exemplary look-down digital imaging device 100 is shown. Look-down digital imaging device 100 is suspended over a desktop (or other surface) 102 by, for example, frame 112. An original (e.g., a document page) 114 is positioned face up on desktop 102 below look-down digital imaging device 100. In the exemplary implementation of FIG. 1, look-down digital imaging device 100 includes light sources $110_A$ and $110_B$ for illuminating original 114. Look-down digital imaging device 100 further comprises housing 104 that includes a lens 108 for focusing reflected light from original 114 onto sensor 106. Preferably, sensor 106 is a linear sensor (or "linear array") for receiving light reflected from original 114 and converting the light to electrical signals based on the intensity of such reflected light. Most preferably, sensor 106 utilizes a tri-liner color coupled-charge device (CCD) array (or similar imaging technology) to provide a high resolution scan of an area of desktop 102 that is located below the look-down digital imaging device 100. However, various embodiments may be implemented utilizing any suitable image pick-up device now known or later developed, and any such embodiments are intended to be within the scope of the present invention. Additionally, lens 108 may provide a reduction optics that reduces the original image on the desktop 102 to an appropriate size for sensor 106. For example, original 114 may be a document page that is 8.5" wide, and the reduction optics of lens 108 may reduce document page 114 to the size of sensor 106, which may, for instance, be 1" or 2" wide. It should be recognized, of course, that any suitable lens 108 now known or later developed may be implemented within look-down digital imaging device 100, and any such implementation is intended to be within the scope of the present invention.

Various embodiments of the present invention may be implemented within any type of look-down digital imaging device, including without limitation digital document cameras, to enable calibration of such look-down digital imaging device, and any such implementation is intended to be within the scope of the present invention.

Turning to FIG. 2A, an exemplary implementation of one embodiment of the present invention is shown. As shown, look-down digital imaging device 200 comprises housing 202, which includes an image head (or "scan head") 204. Image head 204 includes lens 206 and sensor 208 for capturing a digital image of an original 218 positioned below look-down digital imaging device 200 on desktop (or other surface) 216. More specifically, light sources $210_A$ and $210_B$ illuminate original 218, and light reflects from original 218 along the image path 220 to lens 206. Lens 206 receives the reflected light and focuses it on sensor 208, which converts the received light intensity into electrical energy to achieve a digital image of original 218.

Figure 2B:
FIG. 2B shows the exemplary implementation of FIG. 2A wherein the image head and the hood are aligned to allow for calibration to be performed.

As further shown in the exemplary implementation of FIG. 2A, housing 202 also includes a calibration hood 212, which includes calibration area 214. Calibration area 214 may be any suitable image, for example, that may be utilized for calibrating look-down digital imaging device 200. In this embodiment, image head 204 is preferably capable of pivoting, rotating, or otherwise moving within housing 202 to align with hood 212. Alternatively, hood 212 may be capable of moving within housing 202 to achieve such alignment with image head 204. FIG. 2B shows the exemplary implementation of FIG. 2A wherein image head 204 is aligned with hood 212 to allow for calibration of look-down digital imaging device 200 to be performed. As shown in FIG. 2B, once image head 204 is aligned with hood 212, image head 204 can scan calibration area 214. Preferably, hood 212 provides a protected, controlled environment which, for example, may prevent external light from effecting the reflected light from calibration area 214. Calibration area 214 is preferably a known image, such that look-down digital imaging device 200 can analyze data received from scanning such calibration area 214 to determine the proper calibration by adjusting its imaging hardware (e.g., sensor 208 and lens 206) and/or software. For example, by analyzing data received from scanning the known image of calibration area 214, look-down digital imaging device 200 may properly adjust its operation such that a high quality digital image of an original is subsequently obtained.

As will be discussed in greater detail hereafter, hood 212 may be referred to as a "de-focused hood" and the calibration process performed utilizing this embodiment may be referred to as "de-focused calibration." More specifically, in this exemplary implementation, the image of calibration area 214 is not in focus when scanned by image head 204. However, calibration of look-down digital imaging device 200 may still be achieved even though calibration area 214 is not in focus. For example, calibration area 214 may be an area that is suppose to appear as a very uniform area. Uniformity of calibration area 214 may be properly determined even though such calibration area 214 is not in focus. More particularly, "photo response nonuniformity" of de-focused calibration area 214 may be determined, and look-down digital imaging device 200 may be calibrated based on such determination. For instance, the response of sensor 208 may be calibrated based on any detected nonuniformity in its response to a scan of calibration area 214. Additionally, because calibration area 214 is out of focus, if a streak or a pixel having nonuniformity (e.g., a pixel that is darker or lighter than surrounding pixels) is detected, for example, then operation of the imaging system may be adjusted to properly calibrate out such nonuniformity defects.

Accordingly, during calibration operation of this embodiment, image head 204 pivots, rotates, or otherwise moves to a position wherein it is aligned with hood 212 to enable a scan of calibration area 214. Preferably, light sources $210_A$ and $210_B$ illuminate calibration area 214, and image head 204 performs a scan of such calibration area 214 to obtain image data that may then be analyzed for calibrating look-down digital imaging device 200. As discussed above, in this embodiment, calibration area 214 is not in focus for a scan by image head 204. However, calibration may be accomplished by, for example, look-down digital imaging device 200 analyzing the uniformity of the captured digital image data for the de-focused calibration area 214. Thus, for instance, any nonuniformity of the de-focused image or actual detail (i.e., image data in focus) recognized in the image of de-focused calibration area 214 may be determined to be a defect in sensor 208 (or some other hardware/software component) that needs to be calibrated out. Additionally, look-down digital imaging device 200 may also perform a "dark calibration," wherein the light sources (e.g., 210A and 210B) are turned off such that calibration area 214 is not illuminated. By performing such a dark calibration, look-down digital imaging device 200 may ensure that it captures a completely black (or dark) digital image of calibration area 214. For example, sensor 208 (i.e., the image pick-up device) may not output a zero signal (indicating no light reflection) when scanning such a completely dark area, but may instead output a very small signal (e.g., voltage level). Accordingly, by performing such a dark calibration scan and analyzing the output of sensor 208 in comparison with an expected output, look-down digital imaging device 200 can adjust/calibrate itself to properly interpret reflected light intensities from an original.

Thus, look-down digital imaging device 200 may measure the voltage output for each pixel of the known calibration area 214 when the area is illuminated and when very dark to ensure that it is properly calibrated. More specifically, look-down digital imaging device 200 may store information obtained from such a calibration scan either in the look-down digital imaging device itself or in a computer to which such device may be coupled, and the appropriate correcting factors may then be applied for a subsequent scan of an original to ensure that the digital image captured is an accurate likeness of the original (e.g., appropriate color, no streaks, appropriate darkness, etc.). That is, appropriate adjustments are made in the look-down digital imaging device's hardware and/or software to ensure that it is properly calibrated for scanning an original. Accordingly, based on analysis of the captured image data for calibration area 214, look-down digital image device 200 may adjust its imaging operation (e.g., hardware and/or software components), much as is commonly performed in calibration of flatbed scanners, for example, to enable a high quality, accurate digital image to be captured by look-down digital imaging device 200 upon a subsequent scan of an original.

It should be recognized that this embodiment provides a system and method for calibrating a look-down digital imaging device. More specifically, a calibration area is included within a look-down digital imaging device, which such look-down digital imaging device may scan to obtain imaging data that can be utilized for the look-down digital imaging device to calibrate itself. In this embodiment, the calibration area included within the look-down digital imaging device is not in focus for the calibration scan, but imaging data captured for the de-focused calibration area may be relied upon by look-down digital imaging device to calibrate itself based on, for example, uniformity of the captured digital image. This embodiment advantageously enables calibration to be performed within the controlled environment of the look-down digital imaging device itself. Thus, for instance, rather than utilizing a calibration image that is placed on the target scan area (e.g., desktop) below the look-down digital imaging device, this embodiment enables all calibration functionality to be maintained within the controlled environment of the look-down digital imaging device itself This embodiment also enables the look-down digital imaging device 200 to remain compact in size. A complex calibration system requiring a large number of additional components and/or requiring the overall size and/or production cost of look-down digital imaging device 200 to increase in order to accommodate such complex calibration system is avoided by this embodiment, and instead a relatively simple calibration system is included within look-down digital imaging device 200, which enables desired calibration capability within the controlled environment of the look-down digital imaging device itself. That is, calibration area 214 being implemented within look-down digital imaging device 200 does not require that the overall size, production cost, or complexity of look-down digital imaging device 200 be increased an unacceptable amount.

Turning now to FIG. 3, an exemplary implementation of a preferred embodiment of the present invention is shown. A preferred embodiment further improves the calibration quality of the above embodiment by enabling a calibration area to be in focus when a calibration scan is performed. That is, a preferred embodiment enables the calibration path (i.e., the reflected light path during a calibration) to mimic (or be very similar) to the image path of an original (i.e., the reflected light path during a scan of an original). Scanning a de-focused calibration area, as described for the above embodiment, somewhat limits the calibration of the look-down digital imaging device. For example, because the calibration area is not in focus, the illumination of an original by the light sources of a look-down digital image device may not be correctly adjusted/calibrated. For instance, it may be desirable to ensure that light is uniform across an original, e.g., such that light intensity does not "roll off" the edges of an original. When the calibration area is de-focused, calibration to ensure for such uniformity of light may be limited. That is, accurately analyzing the imaging data captured from a calibration scan for uniformity of illumination is difficult because of the calibration area being out of focus. Thus, while an embodiment that utilizes a de-focused calibration technique enables a limited amount of calibration of the look-down digital imaging device (e.g., calibrating the imaging sensor, the lens, and/or software) based on, for example, analysis of uniformity of the captured digital image, the overall quality of such a de-focused calibration is somewhat limited. Thus, a preferred embodiment provides a system and method for calibrating a look-down digital imaging device, which further improves the quality of the calibration by enabling the look-down digital imaging device to scan a focused calibration area.

As with the above embodiment described in conjunction with the exemplary implementation of FIGS. 2A and 2B, a preferred embodiment includes a calibration area (e.g., calibration area 314 of FIG. 3) within the controlled environment of the look-down digital imaging device itself (e.g., within housing 302 of look-down digital imaging device 300 shown in FIG. 3). A preferred embodiment utilizes a "folded optical path" technique to enable the calibration path to mimic the image path of an original, thereby further improving the calibration of the look-down digital imaging device. That is, a preferred embodiment utilizes a folded optical path to enable the calibration area to be in focus (as an original would be) during calibration of the look-down digital imaging device.

As shown in FIG. 3, look-down digital imaging device 300 comprises housing 302, which includes an image head (or "scan head") 304. Image head 304 includes lens 306 and sensor 308 for capturing a digital image of an original (not shown) that is positioned below look-down digital imaging device 300. As further shown in the exemplary implementation of FIG. 3, housing 302 also includes a calibration hood 312, which includes calibration area 314. Calibration area 314 may be any suitable image, for example, that may be utilized for calibrating look-down digital imaging device 300. As with the exemplary implementation of FIGS. 2A and 2B, image head 304 is preferably capable of pivoting, rotating, or otherwise moving within housing 302 to align with hood 312. Alternatively, hood 312 may be capable of moving within housing 302 to achieve such alignment with image head 304. FIG. 3 shows image head 304 as being aligned with hood 312 to allow for calibration of look-down digital imaging device 300 to be performed.

As shown in FIG. 3, once image head 304 is aligned with hood 312, image head 304 can scan calibration area 314 via a folded optical path, which is described in greater detail hereafter. Preferably, hood 312 provides a protected, controlled environment which, for example, may prevent external light from effecting the reflected light from calibration area 314. Calibration area 314 is preferably a known image, such that look-down digital imaging device 300 can analyze data received from scanning such calibration area 314 to determine the proper calibration by adjusting its imaging hardware (e.g., sensor 308 and lens 306) and/or software. For example, by analyzing data received from scanning the known image of calibration area 314, look-down digital imaging device 300 may properly adjust its operation such that a high quality digital image of an original is subsequently obtained.

As will be discussed in greater detail hereafter, hood 312 may be referred to as a "focused hood" and the calibration process performed utilizing this preferred embodiment may be referred to as "focused calibration." As shown, focused hood 312 includes mirrors 316 and 318, which function to fold the calibration path in order to mimic the image path of an original to be scanned. More specifically, light source 310 illuminates calibration area 314 via folded illumination path $320_A/320_B$. That is, light source 310 provides illumination $320_A$ that is reflected (or "folded") by mirror 316 resulting in illumination $320_B$, which illuminates calibration area 314. Light is reflected from calibration area 314, and such reflected light (or "calibration path") is folded via mirrors 316 and 318 to mimic the image path of an original to be scanned. More specifically, calibration area 314 reflects light $322_A$ toward mirror 316. Light $322_A$ is reflected (or folded) by mirror 316 as mirror 316 directs the reflected light (shown as $322_B$) toward mirror 318. In turn, light $322_B$ is reflected (or folded) by mirror 318 as mirror 318 directs the reflected light (shown as $322_C$) toward mirror 316. Mirror 316 again folds the reflected light as it directs the reflected light (shown as $322_D$) back toward mirror 318. Mirror 318 then directs the reflected light (shown as $322_E$) toward lens 306, which focuses the received reflected light on sensor 308. In this manner the sum of the folded calibration paths $322_A$, $322_B$, $322_C$, $322_D$, and $322_E$ mimic the image path of an original to be scanned in order to bring calibration area 314 into focus, thereby allowing for a more accurate calibration of look-down digital imaging device 300.

Of course, calibration may be performed in a manner such that the focus of the calibration area to be scanned during calibration corresponds to the focus of the original to be scanned. For example, a user may zoom in/out on an original thereby altering the focus of such original. Calibration may be performed utilizing the same focus (e.g., zoom in/out) as the user desires for to be used for scanning an original. Thus, the LLAS of a most preferred embodiment may be calibrated specifically for the particular focus desired (e.g., zoom in/out) for an original to be scanned.

Additionally, in a most preferred embodiment, a user may adjust the height of look-down digital imaging device 300 above a target scan area (e.g., a desktop), thereby altering the focus of an original in such target scan area. In a most preferred embodiment, the folding of the calibration path may be adjusted to correspond to (or mimic) the optical path of reflected light from the target scan area to lens 306 (i.e., the "image path"). That is, the look-down digital imaging device may be implemented to adjust the folding of the calibration path in response to a change in the height of scan head 304 (and/or housing 302) above a target scan area, such that the calibration path properly mimics the length of the image path of an original to be scanned. For example, housing 302 may be adjustably coupled to a stand (e.g., stand 112 of FIG. 1) in a manner that enables look-down digital imaging device 300 to determine the height of lens 306 above a target scan area by, for example, monitoring its position on the stand. For instance, as the housing 302 is raised or lowered on its stand, look-down digital imaging device 300 may determine the height of lens 306 above a target scan area based on the corresponding position of housing 302 relative to its stand. Of course, other methods of determining the height above a target scan area may be implemented, some of which may not be based at all on a corresponding stand, and any method now known or later developed for determining the height of a look-down digital imaging device above a target scan area is intended to be within the scope of the present invention.

Turning now to FIGS. 4A and 4B, an exemplary implementation of a look-down digital imaging device 400 that adjusts the calibration path to mimic the image path of an original to be scanned in response to a change in the height of lens 306 (e.g., a change in the height of scan head 304 and/or housing 302) above a target scan area is shown. As shown in FIG. 4A, look-down digital imaging device 400 comprises housing 302, which includes an image head (or "scan head") 304 similar to look-down digital imaging device 300 of FIG. 3. Image head 304 includes lens 306 and sensor 308 for capturing a digital image of an original (not shown) that is positioned below look-down digital imaging device 300. As further shown in the exemplary implementation of FIG. 3, housing 302 also includes a calibration hood 412, which includes calibration area 414. Calibration area 414 may be any suitable image, for example, that may be utilized for calibrating look-down digital imaging device 400. As with the exemplary implementation of FIG. 3, image head 304 is preferably capable of pivoting, rotating, or otherwise moving within housing 302 to align with hood 412. Alternatively, hood 412 may be capable of moving within housing 302 to achieve such alignment with image head 304. FIG. 4A shows image head 304 as being aligned with hood 412 to allow for calibration of look-down digital imaging device 400 to be performed.

As shown in the exemplary implementation of FIG. 4A, once image head 304 is aligned with hood 412, image head 304 can scan calibration area 414 via a folded optical path, which is described in greater detail hereafter. Calibration area 414 is preferably a known image, such that look-down digital imaging device 400 can analyze data received from scanning such calibration area 414 to determine the proper calibration by adjusting its imaging hardware (e.g., sensor 308 and lens 306) and/or software. For example, analyzing data received from scanning the known image of calibration area 414, look-down digital imaging device 400 may properly adjust its operation such that a high quality digital image of an original is subsequently obtained.

In this exemplary implementation of a preferred embodiment, the calibration path is adjustably folded to mimic the image path of an original to be scanned. That is, look-down digital imaging device 400 determines the length of the image path of an original to be scanned based on the height of lens 306 above a target scan area, and adjusts the calibration path to correspond to the determined image path for an original in order to allow for an accurate, focused calibration operation. As shown in the exemplary implementation of FIG. 4A, focused hood 412 includes mirrors 414, 416, 418, 420, 422, and 424, which function to fold the calibration path in a manner that mimics the length of the image path of an original to be scanned. More specifically, light source 310 illuminates calibration area 314 via folded illumination path $320_A/320_B$. That is, light source 310 provides illumination segment $320_A$ that is reflected (or "folded") by mirror 414 resulting in illumination segment $320_B$, which illuminates calibration area 314. Light is reflected from calibration area 314, and such reflected light (or "calibration path") is folded via one or more of mirrors 414, 416, 418, 420, 422, and 424 in a manner that mimics the corresponding length of the image path of an original to be scanned.

In the exemplary implementation of FIG. 4A, look-down digital imaging device 400 first determines the length of the image path of an original to be scanned (e.g., determines the height of lens 306 above the target scan area). In the example shown in FIG. 4A, look-down digital imaging device 400 determines that to mimic the length of the image path of an original to be scanned, the calibration path is folded by every mirror of hood 412. More specifically, calibration area 314 reflects light segment $426_A$ toward mirror 414. Light segment $426_A$ is reflected (or folded) by mirror 414 as mirror 414 directs the reflected light (shown as segment $426_B$) toward mirror 416. In turn, light segment $426_B$ is reflected (or folded) by mirror 416 as mirror 416 directs the reflected light (shown as segment $426_C$) toward mirror 418. Mirror 418 again folds the reflected light as it directs the reflected light (shown as segment $426_D$) toward mirror 420. Mirror 420 folds the reflected light as it directs the reflected light (shown as segment $426_E$) toward mirror 422. Mirror 422 again folds the reflected light as it directs the reflected light (shown as segment $426_F$) toward mirror 424. Mirror 424 then directs the reflected light (shown as segment $426_G$) toward lens 306, which focuses the received reflected light on sensor 308. In this manner the sum length of the folded segments $426_A$, $426_B$, $426_C$, $426_D$, $426_E$, $426_F$, and $426_G$ of the calibration path mimic the corresponding length of the image path of an original to be scanned, thereby allowing for a more accurate calibration of look-down digital imaging device 400. That is, look-down digital imaging device 400 determines that folding the calibration path in this manner results in the calibration path corresponding to (or being very similar to) the length of the image path of an original to be scanned.

Turning to FIG. 4B, a further exemplary implementation of this embodiment of look-down digital imaging device 400 is shown. In the exemplary implementation of FIG. 4B, the height of lens 306 above the target scan area has changed from that of FIG. 4A. For instance, a user may have adjusted the height of image head 304 relative to the target scan area (e.g., relative to a desktop or platen) below look-down digital imaging device 400. Thus, the length of the calibration path is adjusted accordingly in order to mimic the length of the new image path of an original to be scanned. For instance, look-down digital imaging device 400 may first determine the new length of the image path of an original to be scanned (e.g., determines the height of lens 306 above the target scan area). In response, look-down digital imaging device 400 slightly pivots one or more of mirrors 414, 416, 418, 420, 422, and 424 in a manner that folds the calibration path to appropriately mimic the determined length of the new image path of an original to be scanned. In the example shown in FIG. 4B, look-down digital imaging device 400 has pivoted one or more of mirrors 414, 416, 418, 420, 422, and 424 such that reflected light from calibration area 314 is directed from mirror 414 to mirror 420, which in turn directs the reflected light to sensor 306. More specifically, calibration area 314 reflects light segment 426$_A$ toward mirror 414. Light segment 426$_A$ is reflected (or folded) by mirror 414 as mirror 414 directs the reflected light (shown as segment 426B) toward mirror 420. In turn, light segment 426$_B$ is reflected (or folded) by mirror 420 as mirror 420 directs the reflected light (shown as segment 426$_C$) toward lens 306, which focuses the received reflected light on sensor 308. Thus, a much shorter calibration path than that of FIG. 4A is achieved in order to correspond the length of the calibration path to the determined length of the image path for an original to be scanned. In this manner the sum length of the folded segments 426$_A$, 426$_B$, and 426$_C$ of the calibration path mimic the length of the image path of an original to be scanned, thereby allowing for a more accurate calibration of look-down digital imaging device 400. That is, look-down digital imaging device 400 determines that folding the calibration path in this manner results in the calibration path corresponding to (or being very similar to) the image path of an original to be scanned.

As discussed above, in a preferred embodiment, calibration area 314 is in focus for a scan by image head 304 by folding the reflected light from calibration area 314 to mimic the image path of an original to be scanned. Thus, a very accurate calibration may be achieved, in which the uniformity of illumination may even be calibrated, for example. For instance, while external light illuminating an original may not be accounted for in the calibration of the look-down digital imaging device, the uniformity of illumination as supplied by the light source of the look-down digital imaging device itself can be achieved through such calibration. Additionally, such a look-down digital imaging device may also perform a "dark calibration," wherein the light sources are turned off such that calibration area 314 is not illuminated. By performing such a dark calibration, such look-down digital imaging device may ensure that it captures a completely black (or dark) digital image of calibration area 314 during such a dark scan, and can calibrate out any inconsistencies.

Thus, such a look-down digital imaging device may measure the voltage output for each pixel of the known calibration area 314 when the area is illuminated and when very dark to ensure that it is properly calibrated. More specifically, such look-down digital imaging device may store information obtained from such a calibration scan either within the look-down digital imaging device itself or in a computer to which such device may be coupled, and the appropriate correcting factors may then be applied for a subsequent scan of an original to ensure that the digital image captured is an accurate likeness of the original (e.g., appropriate color, no streaks, appropriate darkness, etc.). That is, appropriate adjustments are made in the look-down digital imaging device's hardware and/or software to ensure that it is properly calibrated for scanning an original. Accordingly, based on analysis of the captured image data for calibration area 314, the look-down digital image device may adjust its imaging operation (e.g., hardware and/or software components), much as is commonly performed in calibration of flatbed scanners, for example, to enable a high quality, accurate digital image to be captured by the look-down digital imaging device upon a subsequent scan of an original.

It should be recognized that this preferred embodiment provides a system and method for calibrating a look-down digital imaging device. More specifically, a calibration area is included within a look-down digital imaging device, which such look-down digital imaging device may scan to obtain imaging data that can be utilized for the look-down digital imaging device to calibrate itself. In this embodiment, the calibration area included within the look-down digital imaging device is in focus for the calibration scan, which enables a very accurate calibration of the look-down digital imaging device. This preferred embodiment advantageously also enables calibration to be performed within the controlled environment of the look-down digital imaging device itself. Thus, for instance, rather than utilizing a calibration image that is placed on the target scan area (e.g., desktop) below the look-down digital imaging device, this preferred embodiment enables all calibration functionality to be maintained within the controlled environment of the look-down digital imaging device itself. This preferred embodiment also enables the look-down digital imaging device to remain relatively compact in size. A complex calibration system requiring a large number of additional components and/or requiring the overall size and/or production cost of the look-down digital imaging device to increase in order to accommodate such complex calibration system is avoided by this embodiment, and instead a relatively simple calibration system is included within the look-down digital imaging device, which enables desired calibration capability within the controlled environment of the look-down digital imaging device itself. However, the size of the look-down digital imaging device of a preferred embodiment having a focused calibration system implemented therein may be increased over an implementation utilizing a non-focused (or "de-focused") calibration system. Although, while the overall size of the look-down digital imaging device of a preferred embodiment may be slightly increased, the accuracy of the calibration may be greatly enhanced.

Figure 5:
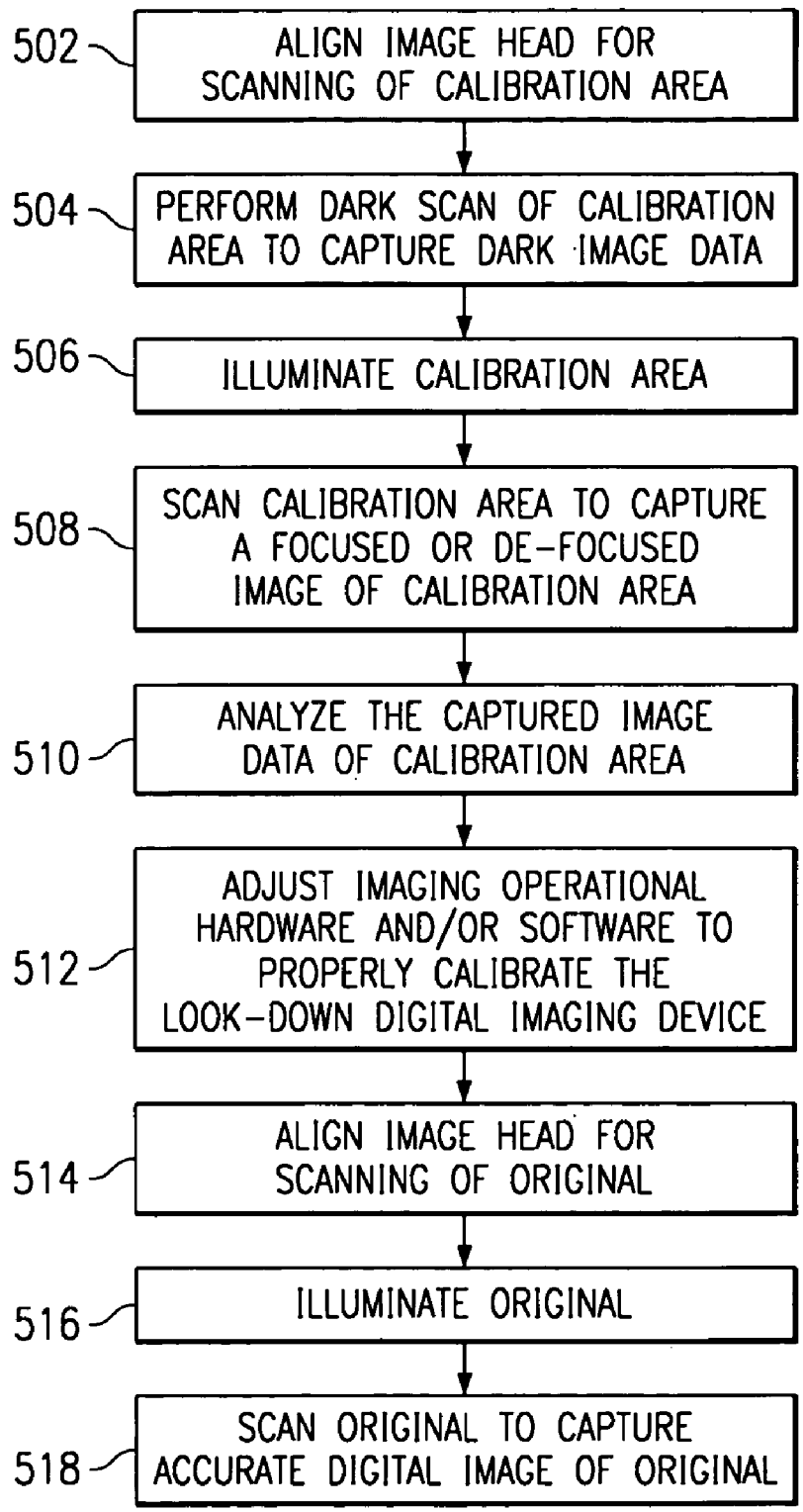
FIG. 5 shows an exemplary operational flow diagram for calibration of a look-down digital imaging device.

Turning now to FIG. 5, an exemplary operational flow diagram for calibration of a look-down digital imaging device is provided. As shown, a look-down digital imaging device first aligns its image in a position for scanning a calibration area provided within the look-down digital imaging device, at block 502. At block 504, the look-down digital imaging device may perform a dark scan of the calibration area in order to capture dark image data. That is, calibration may be performed with the light source of the look-down digital imaging device turned off. Thereafter, at block 506, the light sources may be turned on to illuminate the calibration area, and at block 508, the look-down digital imaging device scans the calibration area to capture a focused or de-focused image thereof. At block 510, the look-down digital imaging device analyzes the captured image data of the calibration area, and at block 512, the look-down digital imaging device adjusts its imaging operational hardware and/or software to properly calibrate the look-down digital imaging device. Thereafter, in response to a previous or subsequent user request to scan an original, the look-down digital imaging device aligns its image head in a position for scanning an original, as shown at block 514. At block 516, the light sources illuminate the original. As described above, the light sources are turned on for the calibration step of block 508, and most preferably the light sources remain on at block 516 to illuminate the original to be scanned. Finally, at block 518, the look-down digital imaging device scans the original to capture an accurate digital image of such original.

It should be understood that the operational flow diagram of FIG. 5 is intended as one example of the calibration operation of a look-down digital imaging device, which renders the disclosure enabling for various other operational flows for calibration, and any suitable operational flow for performing calibration of a look-down digital imaging device utilizing a calibration area included within such a look-down digital imaging device is intended to be within the scope of the present invention. It should also be understood that calibration may be initiated upon each request from a user to scan an original, upon power-up of the look-down digital imaging device, periodically, and/or according to any other suitable calibration regime. It should also be recognized that the look-down digital imaging device may be a stand-alone digital imaging device (including all necessary hardware, software, memory and any other components for performing digital imaging) and/or the look-down digital imaging device may be coupled to a computer (e.g., a PC, laptop, personal data assistant, etc.). Furthermore, all or a portion of operations necessary for performing digital imaging may be included within a computer to which the look-down digital imaging device is coupled. For example, software may be included on such a computer for interpreting voltage levels output by the look-down digital imaging device's sensor in order to generate a digital image. Accordingly, calibration of such a look-down digital imaging device may include calibrating such digital imaging components (e.g., software) included within a computer to which the look-down digital imaging device is coupled. As a result of the system and method of the present invention for calibrating a look-down digital imaging device, more accurate, high quality digital images can be captured.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of calibrating a look-down digital imaging device, said method comprising:
    focusing on a calibration area within said look-down digital imaging device;
    scanning said calibration area within said look-down digital imaging device to capture image data for said calibration area;
    analyzing said captured image data for said calibration area; and
    adjusting the imaging of said look-down digital imaging device based on said analysis of said captured image data for said calibration area.

2. The method of claim 1 wherein said focusing further comprises:
    folding the optical path of light reflected from said calibration area for said scanning of said calibration area.

3. The method of claim 1 further comprising:
    illuminating said calibration area during said scanning step.

4. A method of calibrating a look-down digital imaging device, said method comprising:
    scanning a calibration area within said look-down digital imaging device to capture image data for said calibration area;
    analyzing said captured image data for said calibration area;
    adjusting the imaging of said look-down digital imaging device based on said analysis of said captured image data for said calibration area; and
    aligning a scan head of said look-down digital imaging device with said calibration area for performing said scanning step.

5. The method of claim 1 wherein said adjusting step comprises at least one adjustment type selected from the group consisting of:
    adjusting imaging hardware of said look-down digital imaging device;
    adjusting imaging software of said look-down digital imaging device; and
    adjusting imaging software of a computer device to which said look-down digital imaging device is coupled.

6. A look-down digital imaging device comprising:
    calibration area arranged within said look-down digital imaging device, wherein said look-down digital imaging device is operable to scan said calibration area for calibration of said look-down digital imaging device, and wherein said look-down digital imaging device is operable to achieve an in-focus scan of said calibration area for calibration of said look-down digital imaging device.

7. The look-down digital imaging device of claim 6 further comprising a scan head.

8. A look-down digital imaging device comprising:
    calibration area arranged within said look-down digital imaging device, wherein said look-down digital imaging device is operable to scan said calibration area for calibration of said look-down digital imaging device; and
    a scan head, wherein said scan head is movable to align with said calibration area.

9. The look-down digital imaging device of claim 7 wherein said scan head includes:
    sensor for imaging an original image placed substantially below said look-down digital imaging device; and lens for focusing reflected light from said original to said sensor.

10. The look-down digital imaging device of claim 9 wherein said sensor is a linear sensor.

11. The look-down digital imaging device of claim 6 wherein the optical path of light reflected from said calibration area during a scan of said calibration area is folded.

12. The look-down digital imaging device of claim 11 further comprising:
at least one mirror for folding the optical path of light reflected from said calibration area.

13. A system for performing digital imaging comprising:
a look-down digital imaging device that includes means for imaging a target scan area and means for calibrating said look-down digital imaging device, wherein the calibrating means uses an internal calibration path that mimics an imaging path to be used by said look-down digital imaging device for imaging said target scan area.

14. The system of claim 13 wherein said means for imaging includes a high resolution linear sensor.

15. The system of claim 13 wherein said means for calibrating includes a calibration area within said look-down digital imaging device.

16. The system of claim 15 wherein said means for calibrating further includes means for focusing said imaging means on said calibration area.

17. The system of claim 15 wherein said means for calibrating further includes means for folding the optical path of light reflected from said calibration area.

18. The system of claim 13 further comprising a computer device to which said look-down digital imaging device is coupled.

19. The method of claim 1 further comprising:
determining an in-focus imaging path for imaging an object with said look-down digital imaging device, wherein said focusing on said calibration area mimics said in-focus imaging path.

20. The method of claim 1 further comprising:
determining length of an image path to be used for said look-down imaging an external object, wherein said focusing on said calibration area comprises adjusting a calibration path used for said scanning of said calibration area to correspond to the length of the image path.

21. The method of claim 1 further comprising:
aligning a scan head of said look-down digital imaging device with said calibration area for performing said scanning step.

22. The look-down digital imaging device of claim 6 wherein said in-focus scan of said calibration uses a calibration path that mimics an in-focus imaging path for scanning an external object.

23. The look-down digital imaging device of claim 7 wherein said scan head is movable to align with said calibration area.

24. A method of calibrating a look-down digital imaging device, wherein said calibrating method does not require ever scanning a calibration area that is external to said look-down digital imaging device, said method comprising:
scanning an internal calibration area of said look-down digital imaging device to capture image data for said internal calibration area;
analyzing said captured image data for said internal calibration area; and
adjusting the imaging of said look-down digital imaging device based on said analysis of said captured image data for said internal calibration area.

25. The method of claim 24 further comprising:
focusing on said internal calibration area.

26. A method of calibrating a look-down digital imaging device, said method comprising:
scanning an internal calibration area of said look-down digital imaging device to capture image data for said internal calibration area;
analyzing said captured image data for said internal calibration area to determine correction information, wherein said correction information is determined without use of any image data of an external calibration area; and
adjusting the imaging of said look-down digital imaging device in accordance with the determined correction information.

27. The method of claim 26 further comprising:
focusing on said internal calibration area.

* * * * *

UNITED STATES PATENT AND TRADEMARK OFFICE
CERTIFICATE OF CORRECTION

| | | |
|---|---|---|
| PATENT NO. | : 6,963,428 B1 | Page 1 of 1 |
| APPLICATION NO. | : 09/626625 | |
| DATED | : November 8, 2005 | |
| INVENTOR(S) | : Robert G. Gann | |

It is certified that error appears in the above-identified patent and that said Letters Patent is hereby corrected as shown below:

In column 11, line 24, before "toward" delete "426B)" and insert -- $426_B$) --, therefor.

Signed and Sealed this

Twelfth Day of May, 2009

JOHN DOLL
*Acting Director of the United States Patent and Trademark Office*